3,031,434
METHOD OF CURING EPOXY COMPONENTS AND HEAT-CURABLE EPOXY COMPOSITIONS
Sol B. Radlove, Chicago, Ill., assignor to The Glidden Company, Cleveland, Ohio, a corporation of Ohio
No Drawing. Filed Aug. 11, 1958, Ser. No. 754,504
17 Claims. (Cl. 260—78.4)

This invention relates to compositions which are reactively cured by baking and which are useful as free-film-forming compositions, coating compositions, impregnants, adhesives, etc. The compositions involve an epoxy component made up of one or more of such epoxidized materials as epoxy resins of the bisphenol-epichlorhydrin types, epoxidized hydrocarbon polymers, epoxidized glyceride drying oil, etc., and an aliphatic alcohol partial ester curing agent prepared from polycarboxylic acid(s) which have been esterified sufficiently to retain substantially only one unesterified carboxyl group per ester molecule.

The invention is based on the concept of securing a stable, one-package, heat-curable composition which solidifies by reason of heat-promoted esterification (cross-linking) reactions occurring between carboxyl groups of the ester curing agent and the oxirane groups of the epoxy component. My copending application Serial No. 749,656, filed July 21, 1958, now abandoned, is directed to somewhat analogous compositions in that solidification (cross-linking) is effected by esterification reactions, but differs from the present invention by being a two-package composition; that is, the acid(s) which react with the oxirane groups are not added until one is ready to bring about the solidifying reactions. Under the concept of the present invention, this is not necessary since the aliphatic alcohol partial ester curing agent is substantially unreactive until heated to an elevated temperature, and hence can be mixed and/or combined with the epoxy component to make a one-package system of useful stability. Thus under the present concept, a stable one-package composition can be prepared, stored and ultimately shipped by the manufacturer to the consumer who can then convert it at will to a solid resinous product simply by heating it adequately. During such heating, the aliphatic alcohol radical(s) of the partial ester curing agent yields free alcohol which is usually volatilized from the composition.

The curing agent consists of or comprises partial esters of polycarboxylic acids, some or all of which can be dienophiles, such as esters of maleic, itaconic or fumaric acid. Diels-Alder adducts prepared from said dienophiles and from diene hydrocarbon monomers can be used as curing agents when converted with aliphatic alcohol(s) to partial esters which contain substantially only one free carboxyl group.

Some constituents of the epoxy component can be solid or highly viscous materials such as solid epoxy resins of the epichlorhydrin-bisphenol type, viscous epoxidized glyceride oils, or viscous epoxidized homo- and/or copolymer hydrocarbons. Epoxidized hydrocarbon polymers at oxirane oxygen contents of 2.3%–7.5%, by weight, are highly viscous materials and like the other materials mentioned above need to be thinned for most uses. While inert solvents can be used in the present invention for such thinning, it is frequently beneficial to increase the film-forming solids content of the solidifiable composition by employing reactive extenders or diluents which ultimately become, at least in part, chemically-integrated into the solidified resinous product.

Accordingly one object of my invention is to provide a stable, liquid, one-package, baking composition which uses normally-stable, thermally-decomposable partial ester curing agents in conjunction with an epoxy component.

Another object is to provide a liquid, baking composition of the type described last above in which (a) at least a part of the partial ester curing agent is an ester which has been prepared from a polycarboxylic dienophile adduct.

A further object is to provide a liquid, stable, one-package, baking composition which combines an epoxy component with a thermally-decomposable aliphatic alcohol partial ester of a preformed Diels-Alder adduct which functions as part or all of the curing agent.

Still another object is to provide an improved method for preparing thermoset resins, coatings, etc. from epoxidized material(s).

Still a further object is to provide a process for making soluble curing agents from certain dicarboxylic acids which are not normally useful as curing agents because of their insolubility in the epoxy resin systems.

Still another object of the invention is to provide certain new aliphatic alcohol ester curing agents for epoxy resin systems.

These and other objects will be understood from the following description of the invention.

In solidifying compositions of the kinds described hereinabove, wherein carboxylic acids react with oxirane oxygen to form ester linkages, water is liberated. Where the compositions are solidified in the form of relatively thin films or layers, such water can be driven off during the baking treatment. However, in thick layers or masses, the water is apt to be trapped in the mass, thereby creating haziness or translucency, porosity, and other difficulties. The same situation can result from the liberated alcohol(s) derived from the thermally-decomposable aliphatic alcohol esters of the curing agent. Thus the present compositions are best employed wherever a thin film or layer is to be solidified (cross-linked). However, where the liberated water and/or alcohol(s) are not objectionable, the compositions can be used for heavier work such as preparing castings, pottings, or moldings. Generally, however, clear, transparent solidified products are desired.

The various components of my compositions will now be described under their separate headings.

THE EPOXY COMPONENT

This component can be composed of a variety of epoxy materials of the following kinds, either individually or in admixture.

I. Epoxidized, hydrocarbon polymers which prior to epoxidation have been prepared from (a) 100% by weight of conjugated dienes preferably those having 4–6 carbon atoms or (b) from copolymerizable mixtures of said conjugated dienes with unsaturated monomeric materials containing the $CH_2=CH-$ or $CH_2=C<$ groups.

II. Epoxidized glyceride oils.

III. Epoxy resins, such as those prepared by condensation of bisphenol and epichlorhydrin.

IV. Diepoxides of cycloaliphatic esters represented by the general formula:

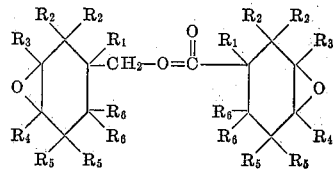

wherein $R_1$ through $R_6$ represent members selected from the group consisting of hydrogen and lower alkyl radicals (see U.S. Pat. 2,716,123).

V. Glycidyl allyl esters of dicarboxylic acids (see U.S. Pat. 2,476,922) and glycidyl ethers.

VI. Crude monoepoxides of diallyl esters of dicarboxylic acids especially the crude monoepoxide of diallyl phthalate.

VII. A variety of less common epoxy materials which respond to the principles of this invention but which are presently of little commercial significance beacuse of high cost, limited supply, or unavailability except as laboratory samples. These can be used as or in the epoxy component.

These illustrative and non-limiting constituents of the epoxy component will now be separately discussed.

THE EPOXIDIZED HYDROCARBON POLYMERS

One of the problems giving rise in part to the concept of the present invention has been that of making solidifiable compositions from the epoxidized homo- and/or copolymer hydrocarbon drying oils prepared from 60–100% by weight of conjugated dienes having 4 to 6 carbons, balance monocyclic vinyl aroamtic compound. The preparation of unepoxidized homo- and/or copolymer oils of this type is described in U.S. Patents 2,652,-342, 2,669,526, 2,762,851, 2,636,910, 2,559,947, 2,708,-639 and 2,826,618, the disclosures of which are here incorporated by reference. These patents teach the preparation of oily homopolymers, such as polybutdaiene, and oily copolymers, such as butadiene/styrene products wherein the butadiene constitutes at least 60% by weight of the starting mixtures of monomers. In the homopolymer oils, I prefer those prepared from butadiene as the conjugated diolefin, and in the copolymer oils I prefer those prepared from butadiene and from styrene. I also prefer to have molecular weights in the oils between about 1,000 and 15,000. I especially prefer the sodium-polymerized homo- and copolymer oils. Such sodium-polymerized diolefin-containing drying oils have good chemical resistance qualities but are difficult to cure in an unmodified condition. A copending application Serial No. 515,208, filed June 13, 1955, now abandoned, describes the improved curability and other merits of the oils secured by epoxidizing said polymeric drying oils, and claims the novel epoxidized products. However, when the oils are epoxidized to an oxirane oxygen content of 2.3%–7.5% by weight and are free of solvent they become extremely viscous and hence are difficult to handle. While inert, volatile solvents can be used to thin them, this expedient markely lowers the film-forming solids contents of the resulting solutions. In order to produce solutions of high film-forming solids I recognized the advantages of using partial esters of Diels-Alder adducts as thinners and curing agents.

The epoxidized hydrocarbon drying oils described hereinabove represent my preferred epoxy material since they presently are available commercially and are somewhat lower in cost than other appropriate epoxy materials. Moreover, they yield solidified products having excellent physical, chemical and resistance properties. However, other epoxy materials listed above can be used in admixture with said epoxidized hydrocarbon oils but in such admixtures I prefer to have at least 50% thereof by weight constituted by the latter. Whether the epoxidized hydrocarbon oils are used in the present invention alone or in admixtures with other epoxy constituents they should have an oxirane oxygen content between about 2.3% and 7.5% by weight and preferably should have an acetyl value below about 60.

Numerous methods for epoxidizing unsaturated organic materials are presently known in the art. A method which works well for the hydrocarbon polymers, the glyceride oils and diallyl phthalate is described and claimed in my copending application Serial No. 515,783, filed June 15, 1955, now abandoned. The disclosure of this application is here incorporated by reference. Another method for epoxidation of hydrocarbon polymer oils using perbenzoic acid is described in U.S. Patent 2,660,563, and the disclosure thereof is here incorporated by reference. Any of the known expodiation methods utilizing peracids which have been preformed or which are formed in-situ can be used for epoxidizing the hydrocarbon polymers and oils and/or the glyceride oils.

EPOXIDIZED GLYCERIDE OILS

While these oils can be used as the sole epoxy material in my epoxy component, they are normally liquid products when the oxirane oxygen content is between about 2.5% and 7.5% by weight. The solids contents of my compositions can be increased beneficially by adding such epoxidized glyceride oils. They can also function as thinners for the epoxidized hydrocarbon polymers.

The glyceride oils which are to be epoxidized can be any of the natural (or equivalent synthetic) oils whose combined fatty acids contain 12–22 carbons and contain sufficient ethylenic unsaturation to be epoxidized to an oxirane oxygen content between about 2.5% and 7.5% by weight. Any suitable methods for epoxidation to this range of oxirane content can be used, especially those which result in a product having a low acetyl value (below about 60, and more preferably below about 35). I prefer the method of my copending application identified above.

EPOXY RESINS

The epoxy resins which are the subject of my invention are complex polymeric, resinuous polyether derivatives of polyhydric phenols and are preferably composed of polyether derivatives of dihydric phenols with polyfunctional halohydrins, said derivatives being free of functional groups other than epoxy and hydroxyl groups, having alternating aromatic and aliphatic nuclei united through ether oxygen and having terminal 1, 2 epoxy groups. The dihydric and/or polyhydric phenols and polyfunctional halohydrins are reacted in manners and proportions well understood in the art (for example, Greenlee Patent No. 2,521,911, here incorporated by reference) so as to form a complex resin of the type described above. Epichlorhydrin and glycerol dichlorhydrin are examples of polyfunctional halohydrins, while resorcinol and bisphenol are examples of dihydric phenols useful in forming such epoxide resins. Bisphenols may be prepared by methods such as are described in U.S. Patent 2,182,308 using phenol and various ketones having up to 6 carbons in each chain attached to the keto group.

The complex epoxide resins contemplated for use in my invention may have a wide range of functionality due to the relative proportions of epoxy and hydroxyl groups in the molecule. Excellent coating compositions may be prepared in accordance with the invention by employing bisphenol-epichlorhydrin resins having an epoxide equivalent of from 210 to 4000, corresponding to an hydroxyl equivalent of 80 to 200. It is known that the epoxy equivalent weight or the epoxy-plus-hydroxyl equivalent weight of any complex epoxide resin such as described above may be related somewhat to the "$n$" value of the formula which theoretically expresses the general chemical nature of the resins resulting from condensation of a polyhydric phenol with epichlorhydrin. Such a formula is:

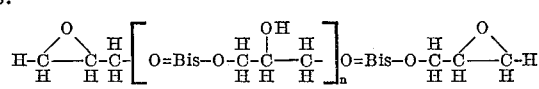

where —O-Bis—O— represents a dihydric phenolic residue such as the bisphenol residue:

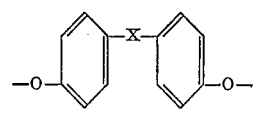

wherein X is the hydrocarbon residue of any cyclic ketone of up to 6 carbons, inclusive, or is the group $$-\overset{R}{\underset{R'}{C}}-$$

in which R represents any alkyl, aryl or alicyclic group having up to 6 carbons inclusive and R' represents any alkyl group of up to 6 carbons, inclusive. The "n" value of the epichlorhydrin-bisphenol condensate may vary from about 0 to about 7 in resins which I have found to be satisfactory for use in preparing my compositions. Various complex epoxy resins of the types described above are currently available as commercial products under the trade-name of "Epon Resins" (Shell Chemicals Company) and Ciba Araldite Epoxy Resins, and are supplied by Shell with information concerning their epoxy and epoxy-plus-hydroxyl equivalents. The "Epon" and/or Ciba Epoxy resins referred to hereinafter in the examples are the reaction products of epichlorhydrin and a 4,4'-dihydroxyl-diphenyl-2,2-propane.

Those skilled in the art will recognize that some of the commercially available epoxy resins are normally liquid in character while the others are normally viscous-to-solid resins. However, they can all be cured by means of the present invention. The viscous-to-solid resins raise the same viscosity problem associated with the epoxidized hydrocarbon drying oils, supra. They can be brought to a liquid condition with a minimum of volatile solvent by the present invention; namely, by thinning them with other epoxy materials, Diels-Alder adduct curing agents, reactive extenders, etc. The normally liquid epoxy resins (e.g. Epon 834), the normally liquid epoxidized glyceride oils, or other normally-liquid epoxy materials listed hereinabove can thus be included for thinning, viscosity and/or film-modifying purposes.

As I have pointed out above, I prefer to use the epoxy resins as a minor portion of the total epoxy component, the major portion thereof being composed of the epoxidized hydrocarbon polymers and/or drying oils. The bisphenol-epichlorohydrin epoxy resins are preferred in such mixtures of epoxy materials.

THE DIEPOXIDES OF CYCLOALIPHATIC ESTERS

These diepoxides whose structural formula is given supra, are presently available commercially and are normally liquid products. Because of their liquid nature they can be used advantageously herein as epoxy thinners for the viscous epoxidized hydrocarbon drying oils or the viscous-to-solid epoxy resins. They can, of course, be used as the sole constituent of the epoxy component and in such use exhibit the same advantages pointed out above but are rather volatile and hence can be lost unless special precautions are taken to minimize such losses, as by curing under pressure.

GLYCIDYL ALLYL ESTERS OF DICARBOXYLIC ACIDS

These esters are mostly normally liquid products, and hence can be used in the present invention in the same ways pointed out above in connection with the epoxidized glyceride oils, the normally liquid epoxy resins and the diepoxides of cycloaliphatic esters. A few of the esters are presently available commercially but their cost militates against extensive use. Moreover, they are less desirable than the other normally liquid epoxy materials for use as the sole constituent of the epoxy component since the materials are somewhat volatile, and there is only one epoxy group per molecule.

Since crude monoepoxides of diallyl esters possess many of the attributes of glycidyl allyl esters, and are considerably cheaper to prepare, I prefer to employ them as epoxy thinners in preference to the glycidyl allyl esters.

Glycidyl ethers such as glycidyl phenol ether, glycidyl isopropyl ether, glycidyl allyl ether which are normally liquid, can be used alone or in admixture with other epoxy materials.

THE CRUDE MONOEPOXIDES OF DIALLYL ESTERS

Copending U.S. application Serial No. 758,894, filed September 4, 1958, now abandoned, describes the preparation of these crude products, and claims the latter. The disclosure of that application is here incorporated by reference.

While diallyl esters of any saturated aliphatic or aromatic dicarboxylic acid can be used to prepare the crude epoxidized products contemplated here, I presently prefer to use diallyl phthalate as the starting ester. In accordance with the teachings of the application identified above, such an ester is treated under epoxidizing condtiions with per-acid or a mixture of hydrogen peroxide and peracid-forming acid so as to introduce approximately one epoxy group per diester molecule. The reaction ordinarily does not go to completion in a reasonable period of time, and connot presently be made selective as to the desired monoepoxide. Accordingly, the resulting treated mass is a liquid mixture of glycidyl allyl phthalate, glyceryl allyl phthalate, unreacted diallyl phthalate and some digycidyl phthalate. For my present purposes, there is no need to purify the mixture since all of the constituents thereof have either ethylenic functionality or esterifiable groupings, or both. Accordingly, I can use the crude product advantageously in the present invention as a liquid epoxy thinner or as the sole constituent of the epoxy component. It is especially useful as a thinner for the viscous epoxidized hydrocarbon drying oils and polymers. For this purpose it should preferably have an oxirane oxygen content above about 2%.

Following is an example taken from said copending application:

To a mixture of 1000 grams of diallyl phthalate, 1440 grams of 40% aqueous peracetic acid containing 93 grams of anhydrous sodium acetate was added during one hour. The mass was agitated in a constant temperature bath maintained at 40° C. During the addition of peracid, the temperature rose to 48° C. This mixture was agitated for about 16 hours in the 40° C. bath and then washed with three 1000 cc. portions of water with saturated brine and with aqueous sodium carbonate until the wash liquor was alkaline to litmus indicator paper. The washed organic material was dried in vacuo at 60° to 65° C. and then filtered. The oxirane oxygen value of the resultant product was 5.0%; theory for monoepoxide=6.1% oxirane oxygen.

By infrared analysis, the resulting product appeared to contain about 40% by weight of glycidyl allyl phthalate, about 40% glyceryl allyl phthalate, about 10% diallyl phthalate, and remainder diglycidyl and/or diglyceryl phthalate. The product can be polymerized by adding a small amount of organic peroxide (e.g. benzoyl peroxide) and can be cured in accordance with the present invention by combining it with the partial ester curing agent(s).

THE PARTIAL-ESTER CURING AGENT

Generically the curing agent used in accordance with the present invention consists of heat-decomposable aliphatic alcohol esters of polycarboxylic acids which contain not substantially more than one unesterified carboxyl group per ester molecule.

As will be understood, my purpose in using partial ester curing agents is to impart shelf-like or time-stability to my liquid, solidifiable, one-package, baking compositions. If instead of using such partial ester curing agents I used polycarboxylic acids, the compositions would solidify soon after the acids had been introduced. In contrast, the partial ester curing agents are substantially unreactive in esterifying (cross-linking) the epoxy component until a mixture of these materials is heated sufficiently to decompose the partial ester and thereby restore the carboxyl groups thereof. It is this feature of my invention which makes it possible now to prepare a one-package solidifiable composition which can enter into commerce as a stable, shippable product.

Any dicarboxylic acids or anhydrides can be used in the invention in the form of their partial esters, as hereinabove defined. Similarly any higher polycarboxylic acids can be used when converted to partial esters having substantially only one unesterified carboxyl group in each ester molecule. For my present purposes, however, there is advantage in using partial ester curing agents which have been prepared in part or in full from polycarboxylic dienophiles, e.g. half esters of $\alpha,\beta$ unsaturated dicarboxylic acids, diesters of tricarboxylic dienophiles, or triesters of tetracarboxylic dienophiles, etc. Adducts of these partial esters are contemplated, as already noted elsewhere herein.

For thin layer uses of my solidifiable compositions, the alcohols used to prepare the partial ester curing agents are preferably the aliphatic straight or branched chain alcohols having up to 8 carbon atoms, e.g. methyl, ethyl, propyl, isopropyl, butyl, and octyl monohydric alcohols or the corresponding glycols. The lower alcohols of 1–4 carbons are preferred for thin layer work because they are readily volatile and are easily cleaved from the partial esters at moderate baking temperatures; e.g., at temperatures up to about 350° F. Both of these attributes make it possible to bake the solidifiable compositions in conventional ovens so as to secure solidification in a relatively short time and to secure clear, transparent cured films or layers.

The partial ester curing agents can be prepared in any of the usual and known manners for making esters. As noted above, however, the method employed should carry the reaction close to the theoretical acid number of the desired partial ester if good package stability is to be secured. A moderate excess (20–40% by weight) of alcohol over stoichiometric proportions is effective in forcing the reaction to the desired theoretical acid number. The unreacted excess of alcohol can be finally stripped off if desired, but I have found that the excess improves package stability and hence is desirably left in the finished product.

The partial ester curing agents are preferably proportioned to the epoxy component so as to provide substantially two carboxyl groups per oxirane group but less or more can be used if desired, i.e., from .2–4 carboxyls per oxirane group.

Less than stoichiometric proportions of two carboxyls per oxirane group, can of course be used where one desires to use part of the oxirane groups for other reactions, such as etherification cross-linking reactions. Ordinarily, however, such etherification reactions proceed more slowly than esterification so that longer baking periods are apt to be necessary for such cross-linking.

It will be understood that a half-ester is to be counted as yielding two carboxyls during the baking treatment. Similarly, diesters of tricarboxylic acids should be counted as yielding three acid groups.

Aliphatic alcohol partial esters which are normally liquid are preferred over similar esters which are normally solid, since the former can be disseminated more easily in the compositions than the latter. The normally solid agents which cannot be melted at temperatures below about 100° C. are preferably ground to a fine powder so as to facilitate fairly uniform dispersion of them in the solidifiable composition.

The following list of polycarboxylic acids and/or their anhydrides can be used in preparing my partial ester curing agents. The list is merely illustrative and should not be construed as limiting the invention to the acids mentioned.

Maleic and its hydrocarbon adducts
Fumaric
Monochloromaleic and its hydrocarbon adducts
Dichloromaleic and its hydrocarbon adducts
Phthalic
Tetrachlorophthalic
Hexahydrophthalic
Adipic
Azelaic
Succinic
Suberic
Tetrahydrophthalic
Dimer (fatty) acids
Itaconic
Diglycolic
Pyromellitic
Nadic anhydride (endo-cis-bicyclo (2.2.1)-5-heptene-2,3-dicarboxylic anhydride)

Mixtures of two or more of the foregoing and/or other anhydrides can, of course be used.

As explained briefly in the opening paragraphs, the partial ester curing agents can comprise or consist of partial esters of polycarboxylic dienophiles, and should ordinarily include the latter in sufficient amount to form adducts where adduct-forming components of my extenders are included for such purpose.

THE EXTENDERS

This component of my compositions is optional but is especially useful where high film-forming solids approaching 100% convertibility are sought. The extenders can be used to thin out the solid and/or viscous constituents of the epoxy component when other constituents of the solidifiable composition either fail to do so adequately or for various reasons are desirably excluded from the said composition. Many of the extenders can be classified as being or containing Diels-Alder adduct formers either because they initially provide conjugated unsaturation or because they can be isomerized to conjugated structures under the baking conditions of acidity and heat. While their adduct-forming qualities can be relied on under some conditions to form adducts in-situ during solidification of my compositions, I ordinarily prefer to pre-react such extenders with the dienophilic esters of the partial ester curing agents so as to preform the desired extending adducts. The resulting adducts, especially when their partial esters are liquid or viscous materials, serve usefully as curing agents.

Aliphatic alcohol esters of adducts which contain not more than about one unesterified carboxyl group per molecule, have special merit in numerous instances since the adduct(s) can have solubility characteristics which the corresponding esters of the acids of said adducts do not possess. Hence by converting insoluble or poorly soluble esters to adducts it is frequently possible to obtain sufficient solubility in my compositions to employ them as the sole curing agent.

The choice of conjugated diene(s) which is to be used to prepare adducts, will, of course, depend on the solubility characteristics which are wanted in the resulting adducts. Little can be offered as guidance in such selection since one must take into account the actual formulation in which he wants improved solubility.

The proportions between the total amount of extenders used as diluents and the epoxy component can be varied widely and in some instances the extenders can constitute a major part of the total weight of material in my solidifiable compositions. Generally, however, the extenders or extending materials forming a part of preformed adducts with partial ester curing agents amount to less than 50% by weight. No significant numerical limits on proportions can be stated since the proportions vary with many factors, e.g. the viscosity of the epoxy component, the thinning effect (if any) due to the use of normally liquid partial ester curing agent, the viscosity of the extender(s), the presence or absence of inert volatile solvent, the amount (if any) of pigment, filler, etc., the viscosity and thinning effects of any preformed adducts employed, the film-forming solids content desired in a particular formulation, and the physical, chemical and resistance qualities desired in the solidified products to be produced from the solidifiable, liquid composition.

The extenders should be of low volatility or relatively non-volatile at temperatures up to about 350° F. and should either be normally liquid or have a liquefaction temperature below about 60–70° C. Only compositions which possess liquidity at the lattter or lower temperatures are contemplated as being within the scope of my invention. Readily volatile extenders should be avoided in coating compositions since they are apt to be volatilized from films of the composition during the baking treatment before they have had an opportunity to become chemically or otherwise integrated with the other components. When special precautions are employed to minimize such losses, as by curing in closed vessels, then the volatility becomes of little significance.

Following is a partial, non-limiting list of materials which function as extenders. They can be used individually or in admixtures. Such materials need not be pure.

Alloocimene
Ocimene
Myrcene
Beta phellandrene
2,4 (8) p-menthadiene
2,4 (5) p-menthadiene
3,8 p-menthadiene
Alpha terpinene
Tung oil
Oiticica oil
Dehydrated castor oil
Conjugated soybean and/or linseed oil
Rosin ond rosin acids

VOLATILE SOLVENTS

My liquid, solidifiable compositions can be thinned, if desired, with small to moderate amounts of volatile organic solvents. These can be in addition to any volatile common solvents employed to promote compatibility, or they can perform this function. They are, of course, driven off during the baking treatment.

PIGMENTS, FILLERS, ETC.

My solidifiable compositions can be modified in color, opaqueness, hiding, etc. by including any of the conventional pigments, fillers, extenders, rheology-modifiers, dyes, etc., which are not affected materially by contact with acids. For some purposes acid-resistant fibrous materials can also be included especially where such materials improve mechanical properties of the solidified masses, films or layers. Small amounts up to about 2% of metallic driers, particularly cobalt and/or zirconium salt (e.g. Zr naphthenate) or soap (e.g. Zr linoleate) driers can be added to the epoxidized hydrocarbon and/or glyceride drying oil components of the composition to improve film hardness. The cobalt and zirconium driers are especially useful because in connection with the hydrocarbon drying oils they induce substantially no color impairment. However, the presence of driers has in some instances lowered the over-all package stability of the finished solidifiable compositions.

VISCOSITY

The viscosity of my liquid compositions which are to be solidified by a baking treatment can vary rather widely, e.g., from about 3 poise at 25° C. to 150 poise or more. For adhesive work, viscosities between about 40 and 70 poises at 25° C. are preferred. For coatings, free-films, impregnations and castings the viscosity will ordinarily be between about 3 and 100 poises at 25° C. and between about 1 and 80 poises at 70° C. As will be understood, different methods of application (as for coating work) require different viscosity and rheological properties. The wide selection of materials which can constitute the epoxy component, the extender component and the partial ester curing agent make it possible under the present invention to secure (with or without pigment, fillers, etc.) desired viscosity and other rheological properties quite easily while yet using relatively low-cost easily-available materials.

THE BAKING TREATMENT

This treatment causes solidification of the potentially-reactive liquid compositions by decomposing the half- or higher partial ester curing agents, by bringing about esterification of the oxirane groupings and in appropriate instances by inducing adduct formation. All these effects of the treatment cause cross-linking of the composition and its conversion to a solid product. Other reactions conducive to cross-linking in other ways are also promoted by the treatment, such as therification cross-linking. Addition polymerization (as between side vinyl groups of the epoxidized hydrocarbon drying oils and the terminal methylene groups of allyl esters) is also promoted. Temperatures up to about 450° F. are useful in this step and time periods at such and lower temperatures of up to 8 hours or so may be needed. I prefer to increase the temperature stepwise or gradually as the baking continues so as to chemically or otherwise integrate as much of the various components as possible before they encounter the higher temperatures which may cause losses due to volatility. One skilled in the art can readily determine an appropriate baking cycle for the particular solidifiable composition which he has at hand.

During the baking of some of my formulations, I have noticed that occasionally the half- or higher partial ester curing agents are precipitated in part from the composition during the early stages of baking. In such instances, however, I have continued the baking treatment and have secured good conversion to a clear solid state. Even in the case of coating films where such precipitation has occurred, the final films were homogeneous and continuous, without showing any flaws where the crystallites resided in earlier stages of the treatment.

The following examples illustrate the principles of my invention and include the best modes presently known to me for practicing those principles.

Example 1

A solidifiable, stable, one-package product was prepared from:

20.9 grams of epoxidized, sodium-polymerized butadiene-styrene (80/20 by wt.) copolymer hydrocarbon drying oil prepared in strict accordance with U.S. Patent 2,762,851, and which after preparation was epoxidized by the method of copending application S.N. 515,783 (supra) to an oxirane oxygen content of about 6% by weight.

14.7 grams monomethyl ester of tetrachlorophthalic anhydride.

25 ml. xylene (to gain a homogeneous single-phase solution).

This composition was applied to electrolytic tin-plated iron panels in the form of films, and the panels and films were baked 10 minutes at 350° F. The resulting films were hard and clear, and exhibited excellent adhesion to the metal of the panels.

The monomethyl ester of tetrachlorophthalic anhydride was prepared from the following materials:

28.6 g. (0.1 mole) tetrachlorophthalic anhydride.
4.1 g. (0.128 mole) anhydrous methanol.

These were heated together on a stream cone overnight. There was only partial solution, so 4.0 g. more of methanol was added and the mixture was heated to reflux which was then maintained for 24 hours. The reaction mass was then liquid, but on being cooled it solidified at 56–65° C. The product was a white, soft solid with an acid value of 154 (theory for the half ester is 177).

*Example 2*

Monomethyl ester of dichloromaleic anhydride was prepared from the following materials:

16.9 grams (0.1 moles) dichloromaleic anhydride.
4.5 grams (0.14 moles) anhydrous methanol.

These were refluxed together on a steam cone for 4 hours. The resulting product was a pale yellow liquid with an acid value of 234 (theory is 332).

A solidifiable coating material was prepared from:

20 grams of the epoxidized hydrocarbon drying oil of Example 1.
7.5 grams of the half ester product prepared above.
15 ml. of xylene.

This composition was applied as a film to metal by drawing it down with a rod, after which the coated panel was baked 10 minutes at 300° F. The resulting film was clear and hard with excellent adhesion.

*Example 3*

A stable one-package coating composition was prepared from the following:

20.3 grams of the epoxidized drying oil of Example 1.
7.3 grams of monomethyl adipate (a commercial product of Eastman; acid value 350 as compared to theoretical acid value 344).
15 ml. of xylene.

This composition had a viscosity of D (Gardner-Holdt). A drawdown on tin plate yielded a film which when baked 10 minutes at 350° F. was clear, hard and flexible.

*Example 4*

Monomethyl phthalate was prepared from:

29.6 grams (0.2 moles) phthalic anhydride.
9.0 grams (0.28 moles) anhydrous methanol.

These materials were refluxed together for about 14 hours. The solution cleared after the first 1–2 hours. The resulting product had an acid value of 245 (theory is 311) and while initially in a liquid state, it slowly deposited crystals at room temperature.

A coating composition was prepared from:

20.0 grams of the epoxidized drying oil of Example 1 thinned with xylene to a solids content of 71.5% and a viscosity $Z_3$ (Gardner-Holdt).
9.1 grams of the monomethyl phthalate prepared above, and
15 ml. xylene.

The resulting composition had a viscosity of L (Gardner-Holdt) and a film thereof applied to tin plate was clear and hard after being baked 10 minutes at 350° F.

*Example 5*

A monomethyl ester of maleic anhydride/alloocimene adduct was prepared from:

1770 g. (12.25 moles) of alloocimene (95% purity, balance myrcene and α-terpinene).
1206 g. (12.25 moles) maleic anhydride.
462 g. (14.5 moles) anhydrous methanol.

The maleic anhydride was added to a five-liter three-neck flask fitted with a stirrer, condenser and thermometer. With stirring, the alloocimene was added at such a rate as to liquefy the maleic anhydride while keeping the pot temperature at about 100–130° C. After the final addition of alloocimene, the reaction mixture was heated for one hour on a steam cone. At this time, the methanol was added to the flask through the condenser. Heating was continued for 4 hours at reflux. The color of the reaction mixture slowly changed from a deep orange to a light orange yellow. The acid value of the finished product was 201 (theory is 210).

A stable coating composition was prepared from:

1660 grams of epoxidized sodium-polymerized drying oil of the composition described in Example 1, but which had been epoxidized to an oxirane oxygen content of 5.4%. The epoxidized oil was thinned with mineral spirits to solids content of 74%, and at this solids content had a viscosity of $Z_5$ (Gardner-Holdt).
1072 grams monomethyl ester of maleic anhydride/alloocimene adduct as prepared above.
250 ml. of monobutyl ether of ethylene glycol. This was added to give a clear solution.
Mineral spirits—added to reduce the viscosity to 40–45 seconds (Ford cup) for roll-coating.

This composition was roll coated on tin plate and then baked 10 minutes at 350° F. The resulting coating was water-white, clear, flexible, and scratch-resistant. When the composition was applied to clean, polished brass sheet and baked for three minutes at 400–425° F., no discoloration of the brass or of the coating was observable. The coated brass worked well when subjected to press-forming operations.

When small quantities (e.g. 0.5% by weight) of cobalt and/or zirconium driers are added, a cure can be obtained by baking 10 minutes at 300° F.

*Example 6*

The following three formulations based on a fixed amount of epoxidized hydrocarbon (HC) drying oil of Example 1 were prepared and cured as films by baking the latter for 10 minutes at 350° F. The resulting films in each case were water-white and hard. The epoxidized drying oil employed here had an oxirane oxygen content of 5.46% by weight, a solids content of 76.1% (solvent was xylene) an acid value of 1.9, and had been prepared by epoxidizing a sodium-polymerized butadiene/styrene copolymer oil having the compositions set forth in Example 1.

FORMULATION A 18.7 g. epoxidized HC drying oil solution
9.4 g. monobutyl phthalate
10 ml. xylene
10 ml. monobutyl ether of ethylene glycol

FORMULATION B 18.7 g. epoxidized HC drying oil solution
7.7 g. monoethyl adipate
15 ml. xylene

FORMULATION C 18.7 g. epoxidized HC drying oil
9.5 g. monoethyl azealate
15 ml. xylene

*Example 7*

The alloocimene adduct of monomethyl maleate of Example 5 was employed as curing agent for an epoxy resin of the epichlorohydrin-bisphenol type. This resin was a commercial normally-liquid product sold under the name Epon 834 (Shell) and had an epoxy equivalent of 224–290 and an average molecular weight of about 450. A heat solidifiable, liquid coating composition was prepared from the following materials:

Epon 834 _____ g__ 10
Alloocimene adduct of Example 5 _____ g__ 10.6
Monobutyl ether of ethylene glycol _____ ml__ 10

This liquid coating was applied to tin plate by drawdown. The panel and applied coating were baked 15 minutes at 400° F. and this treatment resulted in curing the coating to a hard, clear condition.

*Example 8*

The following table illustrates the variable package-stability resulting from the use of monomethyl esters of various dicarboxylic acids. The coating compositions were prepared from an epoxidized sodium-polymerized butadiene (80%)/styrene (20%) drying oil having an oxirane oxygen content of 6.1% and an acid value of 5.8 (at 100% solids). The epoxidized oil was used in the form of a xylene solution having a solids content of 73% and a viscosity of $Z_3$ (Gardner-Holdt). The epoxidized oil solution, half ester components and xylene were blended together in the proportions noted to secure the composition whose initial viscosities are given in the table. (See table, cols. 13 and 14.)

*Example 9*

13.4 g. epoxidized sodium-polymerized polybutadiene (U. S. Patent 2,636,910) drying oil (74.6% NVM, 6.4% oxirane oxygen).
3.0 g. tung oil.
3.8 g. monomethyl maleate.

Mixed all three components in xylene to draw-down viscosity. Baked film on tin plate for ten minutes at 350° F. to cure the film to a clear, adherent, protective condition.

*Example 10*

13.4 g. epoxidized hydrocarbon drying oil of Example 9.
3.0 g. crude monoepoxide of diallyl phthalate (2.77% oxirane oxygen; acetyl value 155).
8.7 g. monomethyl ester of alloocimene/maleic anhydride adduct (Acid Value 200).

*Example 12*

A coating composition was prepared from the following materials:
20 g. epoxidized soybean oil (6.2% oxirane).
10.5 g. monomethyl maleate.
10 m. mineral spirits.

A film of the solution was applied to a steel panel after which the coated panel was heated for 10 minutes at 375° F. A somewhat soft, adherent film was secured.

*Example 13*

Emulsion polymerized (peroxide catalyst) butadiene 75%/styrene 25% copolymer oil epoxidized by the method of S.N. 515,783, supra to an oxirane oxygen content of 6.3 wt. percent (had a solids content of 45.5% by wt.), 15.7 g.
Alloocimene/monomethyl maleate adduct, 6.3 g.
Xylene, 10 ml.

A coating composition prepared by blending the above materials together was applied to aluminum sheet and then the coated sheet was heated for 10 minutes at 375° F. The resulting film was clear, hard, and tough.

*Example 14*

Various samples of a copolymer of butadiene (40%)/propylene (60%) prepared in the manner described in Example 2 of U.S. Patent 2,569,383 by employing $BF_3$ gas as a catalyst were epoxidized by the method de-

| Proportions | | | Half esters dibasic acid | Acid number of mono methyl esters [1] | | | Viscosities (Gardner-Holdt) of xylene solutions containing methyl esters and epoxidized oil | | Comments on films baked 10 minutes at 350° F. |
|---|---|---|---|---|---|---|---|---|---|
| Epoxy oil, g. | Half ester, g. | Xylene, ml. | | Theory | Found | Mol excess, percent | Start | Finish | |
| 20 | 7.5 | 15 | Dichloromaleic | 332 | 235 | 40 | E-F | X (2 hours) | Hard clear film 10′ at 300° F. |
| 27 | 8.0 | | Maleic | 431 | 354 | 20 | Gelled overnight | | Hard, water-white, clear film. |
| 20 | 9.1 | 15 | Phthalic | 311 | 245 | 40 | L | U (7 days) | Softer film than maleic, still good. |
| 20.9 | 14.7 | 25 | Tetrachlorophthalic anhyd. | 177 | 154 | 20 | K | U (12 days) | Good, hard, clear film. |
| 20 | 8.8 | 15 | Nadic anhydride | 286 | 250 | 40 | Crystallized out | | Very hard, clear glossy film. |
| 20.39 | 7.3 | 15 | Adipic [2] | 350 | 344 | | D | T (6 months) | Hard, clear, glossy film. |
| 20 | 6.9 | 15 | Hexahydrophthalic | 301 | 275 | 40 | | V (6 months) | Same as phthalic. |
| 20 | 12.5 | 15 | Maleic/alloocimene adduct.[3] | 210 | 200 | 20 | G-H | 0 (45 days) | Water-white, clear, hard, good adhesion. |

[1] Prepared from 1 mol methanol plus indicated excess.
[2] Ester purchased, Eastman Kodak Co.
[3] Prepared from 1 mol each of maleic anhydride and 95% alloocimene by heating on steam cone with stirring for 1 hour after exothermic reaction completed.

Mixed all three components in xylene to draw-down viscosity. Baked film on tin plate for 10 minutes at 350° F. Resulting film was clear, tenacious and protective.

*Example 11*

Comparable results were secured when the sodium-polymerized polybutadiene drying oil of Example 9 was replaced with an equal weight of one of the following oils which had been epoxidized by the method of S.N. 515,783 (supra) to an oxirane oxygen content of 6%;
(a) Peroxide-polymerized polybutadiene prepared in the manner described under "Synthesis A" U.S. Patent 2,669,526.
(b) $BF_3$/ethyl ether complex polymerized polybutadiene prepared in the manner described in Example 1 of U.S. Patent 2,708,639.
(c) Sodium-polymerized butadiene/styrene copolymer drying oil prepared in accordance with "Synthesis B" of U.S. Patent 2,669,526.

scribed in copending application S.N. 515,783, supra, to oxirane oxygen contents between 2.5% and 2.9% by weight.

The epoxidized polymers were solidified by heating after mixing 2 grams dichloromaleic anhydride with 10 grams of each of the epoxidized polymers.

*Example 15*

A copolymer of butadiene 40%/isoprene (60%) conforming to Example 9 of U.S. Patent 2,569,383 was epoxidized by the method of S.N. 515,783, supra, and then solidified by treating in the manner described in Example 14.

*Example 16*

An oily copolymer prepared from about 75% butadiene and 25% styrene and polymerized in emulsion form by means of a free-radical mechanism (peroxide catalyst) was epoxidized in the manner described in application S.N. 515,783, supra, to an oxirane oxygen content of about 6% by weight. It was solidified by mixing and heating with dichloromaleic anhydride under the conditions and proportions set forth in Example 14.

*Example 17*

Reaction between a polyester and epoxy C-oil (Esso):

6.0 g. polyester (Acid value 32.3; made with propylene glycol, maleic and phthalic anhydrides).
11.2 g. epoxidized sodium-polymerized butadiene (80%)/styrene (20%) drying oil (74.5 NVM in xylene, 6.5% epoxy oxygen).

The polyester was dissolved in 10 ml. of hot toluene. After the addition of the epoxy oil, 5 ml. of isophorone, 5 ml. of butyl Cellosolve and 10 ml. of methyl ethyl ketone were added to gain miscibility.

The drawdown on tin plate was heated for ten minutes at 400° F. The resulting film was water-white, glossy and hard.

*Example 18*

Preparation of the trimethyl ester of pyromellitic acid:

21.8 g. pyromellitic anhydride (Du Pont Co.).
16.0 g. anhydrous methanol.
2 ml. dry HCl in methanol (2.48 N).

The mixture was refluxed on a steam cone for 19 hours; then the excess methanol and HCl was removed under vacuum. The acid value of the crude product was 227.3 (theory 189.3).

Drawdown:

6.7 g. epoxidized sodium polymerized butadiene (80%)/- styrene (20%) drying oil (74.6 NVM, 6.5% epoxy oxygen).
3.0 g. trimethyl ester of pyromellitic acid.

The triester was dissolved in a mixture of 5 ml. of dimethyl formamide and 10 ml. of isophorone. The epoxy oil was then added and complete miscibility was attained with the addition of 5 ml. of high boiling aromatic solvent. The drawdown was baked for ten minutes at 400° F. The film produced was shiny, hard, and slightly yellow.

Having thus described my invention, what I claim is:

1. The method of curing an epoxy component composed essentially of material having at least one oxirane oxygen group in a molecule thereof and selected from the group consisting of: (*a*) epoxidized glyceride oil having an oxirane oxygen content between about 2.5% and 7.5% by weight and an acetyl value below about 60; (*b*) epoxidized hydrocarbon polymers which have an oxirane oxygen content between about 2.3% and 7.5% and an acetyl value below about 60, and which have been prepared by epoxidizing to said oxirane content a polymeric material which contains combined conjugated diolefins in its molecular structure; (*c*) polymeric polyether resinous derivatives of polyhydric phenols, said derivatives having alternating aromatic and aliphatic nuclei united together through ether oxygen, having terminal 1,2 epoxy groups and being free of functional groups other than epoxy and hydroxyl groups; (*d*) diepoxides of cycloaliphatic esters having a structure conforming to the general formula:

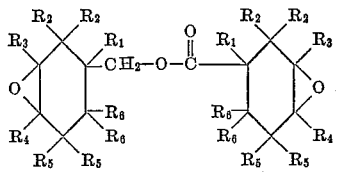

wherein $R_1$ through $R_6$ represent members selected from the group consisting of hydrogen and lower alkyl radicals; (*e*) glycidyl allyl esters of dicarboxylic acids; (*f*) crude monoepoxide of diallyl esters of dicarboxylic acids; and (*g*) mixtures of the foregoing materials, said method comprising the steps of: forming a compatible substantially homogeneous liquid blend of said epoxy component with thermally-decomposable aliphatic alcohol ester curing agent added in the form of thermally-decomposable partial esters selected from the group consisting of: (A) aliphatic alcohol partial esters of polycarboxylic acids which have not more than about one unesterified carboxyl group per molecule, and in which the combined aliphatic alcohol residues are radicals of hydrocarbyl alcohols which contained from 1-8 carbon atoms and up to two esterifiable hydroxyl groups; (B) conjugated hydrocarbon diene adducts of aliphatic alcohol partial esters as defined in A above, wherein the combined acids in the esters of said adducts are Diels-Adler carbon-carbon addition residues of polycarboxylic dienophiles; and (C) mixtures of said A and B materials, said partial ester being added in an amount which supplies free and esterified carboxyl groups in a total of about .2–4 of such groups per oxirane oxygen group in said epoxy component; and subsequently heating said compatible, liquid blend at elevated temperatures up to about 450° F. which induce esterification reactions between oxirane oxygen groups of said epoxy component and said added partial esters, said heating step being continued until said compatible blend has become cured to a solid state.

2. The method as claimed in claim 1 where the combined aliphatic alcohols of said added thermally-decomposable partial esters were monohydric and had 1–4 carbon atoms, and wherein the added partial esters supply free and esterified carboxyl groups in a total of about 2 of such groups per oxirane oxygen groups in said epoxy component.

3. The method as claimed in claim 2 wherein said added partial esters consist essentially of said partial ester adducts of claim 1, group (B), and wherein the conjugated hydrocarbon dienes of said adducts comprise adduct-forming unsaturated terpenes.

4. The method as claimed in claim 3 wherein said adduct-forming unsaturated terpenes are aliphatic in structure.

5. The method as claimed in claim 3 wherein said adduct-forming unsaturated terpenes are monocyclic in structure.

6. The method as claimed in claim 2 wherein said epoxy component comprises at least 50% by weight of said epoxidized hydrocarbon polymers, and wherein said polymers, prior to being epoxidized, contained at least 60% by weight of combined conjugated diolefin having 4–6 carbon atoms, balance monomeric compounds containing the $CH_2=C<$ group.

7. The method as claimed in claim 6 wherein said epoxy component consists of epoxidized hydrocarbon polymers, and wherein the said hydrocarbon polymers, prior to being epoxidized, had been sodium-polymerized and were drying oils composed of about 60–90% by weight of combined butadiene, balance combined styrene.

8. As a one-package, heat-solidifiable composition, a liquid composition whose vehicle is composed essentially of the following materials: (A) an epoxy component composed essentially of material having at least one oxirane oxygen group in a molecule thereof and selected from the group consisting of: (*a*) epoxidized glyceride oil having an oxirane oxygen content between about 2.5% and 7.5% by weight and an acetyl value below about 60; (*b*) epoxidized hydrocarbon polymer which has an oxirane oxygen content between about 2.3% and 7.5% by weight and an acetyl value below about 60, and which has been prepared by epoxidizing to said oxirane content a hydrocarbon polymer which contains combined conjugated diolefins in its molecular structure; (*c*) polymeric polyether resinous derivatives of polyhydric phenols, said derivatives having alternating aromatic and aliphatic nuclei united together through ether oxygen, having terminal 1,2 epoxy groups and being free of functional groups other than epoxy and hydroxyl groups; (*d*) diepoxides of cycloaliphatic esters having a structure conforming to the general formula:

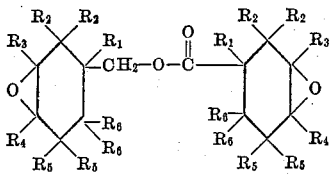

wherein $R_1$ through $R_6$ represent members selected from the group consisting of hydrogen and lower alkyl radicals; (e) glycidyl allyl esters of dicarboxylic acids; (f) crude monoepoxide of diallyl esters of dicarboxylic acids; and (g) mixtures of the foregoing materials; and (B) a thermally decomposable aliphatic alcohol ester curing agent added in the form of thermally-decomposable partial esters selected from the group consisting of (1) aliphatic alcohol partial esters of polycarboxylic acids which have not more than about one unesterified carboxyl group per ester molecule and in which the combined aliphatic alcohol residues are radicals of hydrocarbyl alcohols which had 1–8 carbon atoms and up to two esterifiable hydrooxyl groups; (2) conjugated hydrocarbon diene adducts of aliphatic alcohol partial esters as defined in B(1) last above in which the combined acid residues in the esters of said adducts are Diels-Adler carbon-carbon addition residues of polycarboxylic dienophiles; and (3) mixtures of the materials in B(1) and B(2) above, said partial esters being added in an amount which supplies free and esterified carboxyl groups in a total of about .2–4 of such groups per epoxy group in said epoxy component.

9. A composition as claimed in claim 8 wherein the polycarboxylic acids of said added partial esters were dicarboxylic acids; wherein said epoxidized hydrocarbon polymers constitute at least 50% by weight of said epoxy component, wherein said hydrocarbon polymers, prior to being epoxidized, were composed of at least 60% by weight of combined conjugated dienes of 4–6 carbon atoms, balance monomer compounds containing the $CH_2=C<$ group, wherein the aliphatic alcohols used in preparing said added partial esters of claim 8, group (1) are monohydric hydrocarbyl alcohols of 1–4 carbon atoms, and wherein said added partial esters supply free and esterified carboxyl groups in a total of about 2 of such groups per oxirane oxygen group in said epoxy component.

10. A composition as claimed in claim 9 wherein said epoxidized hydrocarbon polymers, prior to being epoxidized, had been sodium-polymerized and were drying oils composed of 60–90% by weight of combined butadiene, balance combined styrene; wherein said added partial esters consist essentially of said adducts, and wherein the acids used in preparing the partial esters of said adducts are selected from the group consisting of $\alpha,\beta$ unsaturated $\alpha,\beta$ dicarboxylic acids and their anhydrides.

11. A composition as claimed in claim 10 wherein the conjugated hydrocarbon dienes used in preparing said adducts comprise adduct-forming aliphatic unsaturated terpenes.

12. A composition as claimed in claim 11 wherein the conjugated dienes used in preparing said adducts consist essentially of adduct-forming aliphatic unsaturated terenes.

13. A composition as claimed in claim 10 wherein said epoxy component consists of said epoxidized hydrocarbon drying oils.

14. A composition as claimed in claim 13 wherein said epoxidized hydrocarbon drying oil, prior to being epoxidized, was composed of about 75–90% of combined butadiene, balance combined styrene.

15. A composition as claimed in claim 13 wherein said epoxidized hydrocarbon drying oil, prior to being epoxidized, was composed of about 75–90% of comibned butadiene, balance combined styrene, and wherein said composition includes, as an ethylenically-unsaturated additional component, an extender component which has low volatility at temperatures up to about 350° F. and has a liquefaction temperature below about 70° C.

16. A composition as claimed in claim 15 wherein said extender component comprises adduct-forming aliphatic unsaturated terpenes.

17. A composition as claimed in claim 15 wherein said extender component consists essentially of adduct-forming aliphatic unsaturated terpenes.

References Cited in the file of this patent

UNITED STATES PATENTS

| | | |
|---|---|---|
| 2,626,223 | Sattler et al. | Jan. 20, 1953 |
| 2,691,004 | Doyle | Oct. 5, 1954 |
| 2,785,383 | Foster | Mar. 12, 1957 |
| 2,786,794 | Gams et al. | Mar. 26, 1957 |
| 2,921,947 | Millar et al. | Jan. 19, 1960 |